(12) United States Patent
Zaat

(10) Patent No.: US 6,618,654 B1
(45) Date of Patent: Sep. 9, 2003

(54) METHOD AND SYSTEM FOR DISCOVERING AND RECOVERING UNUSED SERVICE LIFE

(75) Inventor: Stephen V. Zaat, Crestwood, MO (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 10/280,389

(22) Filed: Oct. 25, 2002

(51) Int. Cl.⁷ .......................... G06F 7/00; G06F 17/00; G06F 19/00
(52) U.S. Cl. .......................... 701/29; 702/35; 702/42; 702/144; 702/150; 73/87; 73/760; 73/763; 356/32
(58) Field of Search .......................... 701/29, 200, 207, 701/213, 215; 702/141, 144, 150, 35, 42, 152, 153; 73/802, 87, 760, 763, 788, 789; 356/32, 35; 340/988

(56) References Cited

U.S. PATENT DOCUMENTS

| | | | | |
|---|---|---|---|---|
| 4,280,188 A | * | 7/1981 | Weinstein et al. | 702/141 |
| 4,979,992 A | * | 12/1990 | Bache | 106/644 |
| 6,354,152 B1 | * | 3/2002 | Herlik | 73/597 |
| 6,378,387 B1 | * | 4/2002 | Froom | 73/865.8 |
| 6,449,559 B2 | * | 9/2002 | Lin | 701/216 |
| 6,473,676 B2 | * | 10/2002 | Katz et al. | 701/4 |
| 2002/0095242 A1 | * | 7/2002 | Bechhoefer | 700/279 |
| 2002/0170355 A1 | * | 11/2002 | Malametz | 73/514.29 |
| 2003/0004658 A1 | * | 1/2003 | Bechhoefer et al. | 702/56 |
| 2003/0009300 A1 | * | 1/2003 | Giurgiutiu | 702/35 |

OTHER PUBLICATIONS

S.S. Manson, Fatigue: A Complex Subject–Some Simple Approximations, Experimental Mechanics, Jul., 1965, lecture held in Cleveland, Ohio.

U. Muralidharan and S.S. Manson, A Modified Universal Slopes Equation for Estimation of Fatigue Characteristics of Metals, The American Society of Mechanical Engineers, Dec., 1986, Anaheim, California.

Stanley W. Kandebo, Tests Probe F–22 Structures, Aviation Week & Space Technology, Jul. 15, 2002, Marietta, GA.

Piezoelectric Accelerometers, Avionics Magazine, Sep. 2002, Woodlyn, PA.

Rockwell Collins, Digital Quartz Attitude Heading Reference System, Rockwell Collins, Oct., 2000.

* cited by examiner

Primary Examiner—Thomas G. Black
Assistant Examiner—Ronnie Mancho
(74) Attorney, Agent, or Firm—Black Lowe & Graham PLLC

(57) ABSTRACT

A method and system on-board a vehicle is provided for determining cycles to failure of the vehicle. The system includes a vehicle attitude reference or navigation system, a memory, and a processing component. The vehicle attitude reference system generates distance values in 6 degrees of freedom as a result of detected accelerations in the 6 degrees of freedom. The processing component converts the distance values to stress and strain values, and determines cycles-to-failure for one or more of the vehicle parts based on the stress and strain values and associated ductility and spring constant values stored in the memory. The processing component also subtracts the determined cycles to failure for each of the parts from previously-predicted cycles-to-failure, and stores the result of the subtraction in the memory for later use by operators of the vehicle.

20 Claims, 3 Drawing Sheets

METHOD AND SYSTEM FOR DISCOVERING AND RECOVERING UNUSED SERVICE LIFE

FIELD OF THE INVENTION

This invention relates generally to service life of vehicles and, more specifically, to discovering and recovering unused portions of service life of vehicles.

BACKGROUND OF THE INVENTION

Owners of aircraft, such as the military, face a dilemma of trading off between the cost of new replacement aircraft and the cost of modernization and upgrades to existing aircraft. Modernization and upgrades are generally less expensive than new aircraft, but can be financially justified when sufficient service life remains in an aircraft. Traditional methods employed for determining service life expended and service life remaining are based solely upon cumulative flight hours and maximum load assumptions. For aircraft flown under less demanding conditions, actual aircraft service life can be significantly greater than the determined service life.

When modernizations and upgrades are considered for older aircraft, fatigue testing is used to determine service life remaining. Fatigue testing is destructive, very expensive, and time consuming.

Attempts have been made to determine service life of critical aircraft components. One attempt uses a plurality of stress gauges mounted to various locations of the critical aircraft components. The stress gauges are electrically linked to a data processing computer that computes service life based on measured stresses at the gauges. Attaching and wiring a new or an old aircraft with the number of gauges necessary for retrieving adequate stress information is prohibitively expensive and can not possibly identify all the incurred stresses.

Therefore, there exists an unmet need to non-destructively determine service life in a less costly way.

SUMMARY OF THE INVENTION

The present invention reduces time and cost required to develop a business case for proposed modernizations and upgrades of older aircraft, recovers unused service life in legacy aircraft structures, and provides continuous, even real-time, assessment of service life expended and remaining.

The present invention provides a system on-board a vehicle for determining cycles to failure of the vehicle. An embodiment of the system includes a vehicle attitude reference or navigation system, a memory, and a processing component. The vehicle navigation system generates distance values in at least one of 6 degrees of freedom. The distance values result from detected accelerations in at least one of the 6 degrees of freedom. The memory stores ductility and spring constant values for at least one of the 6 degrees of freedom for one or more vehicle parts. The processing component converts the distance values to strain values, and determines cycles-to-failure for one or more of the vehicle parts based on the strain values and associated ductility and spring constant values. The processing component also subtracts the determined cycles to failure for each of the parts from previously-predicted cycles-to-failure, and stores the result of the subtraction in the memory.

According to an aspect of the invention, an embodiment of the system also suitably includes a vehicle crew user interface that alerts the vehicle crew when an alert signal is received from the processing component if the determined cycles-to-failure is less than the previously-predicted cycles-to-failure.

BRIEF DESCRIPTION OF THE DRAWINGS

The preferred and alternative embodiments of the present invention are described in detail below with reference to the following drawings.

DETAILED DESCRIPTION OF THE INVENTION

Figure 1:
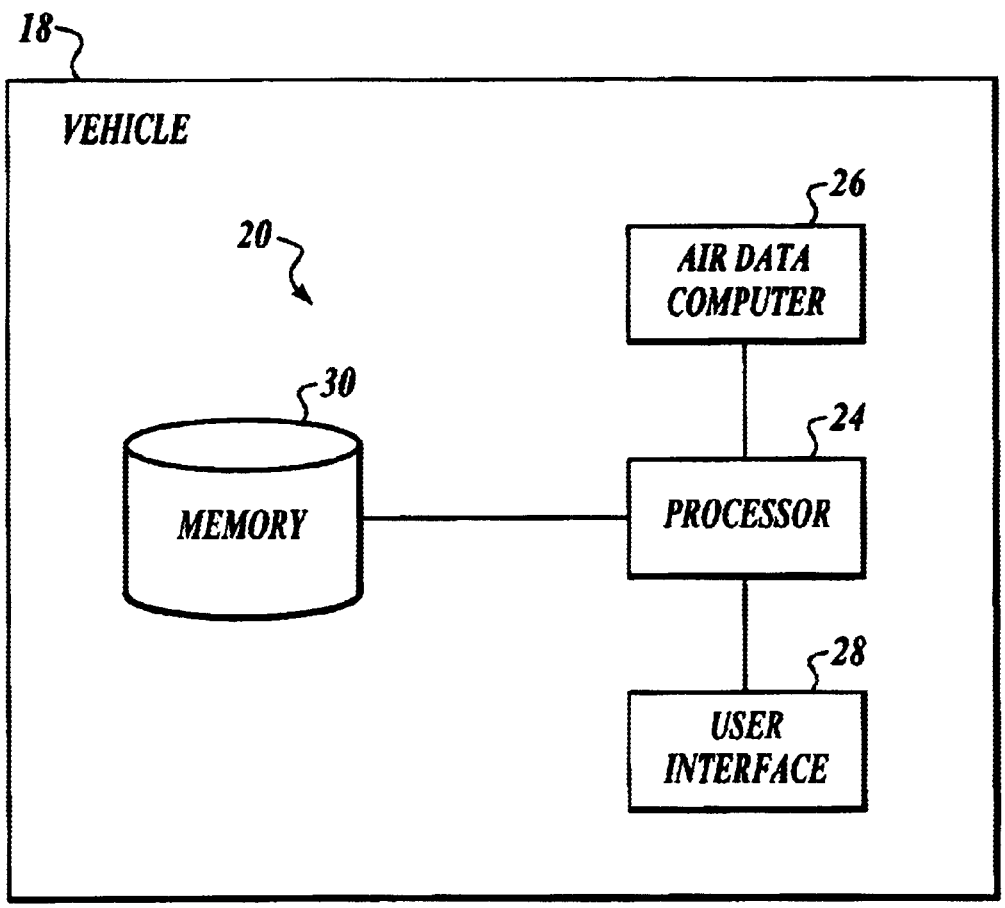
FIG. 1 is a block diagram of an exemplary system formed in accordance with the present invention.

FIG. 1 illustrates a non-limiting example of a system 20 located on a vehicle 18, such as an aircraft, for determining service life (that is, cycles-to-failure) of the vehicle 18 based on flight condition information of the aircraft. The system 20 includes a processor 24 that is coupled to an air data computer 26, a user interface 28, and memory 30. The service life is advantageously determined in real-time or near real-time on the vehicle, because the system 20 is included in the vehicle 18.

The air data computer 26 or similar device suitably provides distance values in three orthogonal axes relative the vehicle. The distance values result from accelerations determined along the three axes. The distance values are sent to the processor 24. The processor 24 transforms the distance values into respective strain values. The processor 24 determines a new service life value for each of the parts that have an associated service life based on the determined strain values and ductility and spring constant values for each part as retrieved from memory 30. The newly determined service life value is subtracted from a previously predicted service life value. The result of the subtraction is stored in the memory 30 for later use by maintenance to determine service life available for each of the parts. The process described above repeats at some previously defined rate. The processor 24 sends alerts to the user interface 28 if the results of the subtraction indicate that any of the parts of the aircraft have reached a premature end to the service life.

The present invention determines the life of an aircraft is limited to the finite life of the part with the lowest amount of life remaining. If the part is replaced, the life of an aircraft is now limited by the next part with the lowest amount of life remaining. The present invention records cycles to failure information for previously determined critical parts. From the recorded information a user can easily determine what parts need replacing and how that is going to affect a replace/repair analysis.

Figure 2:
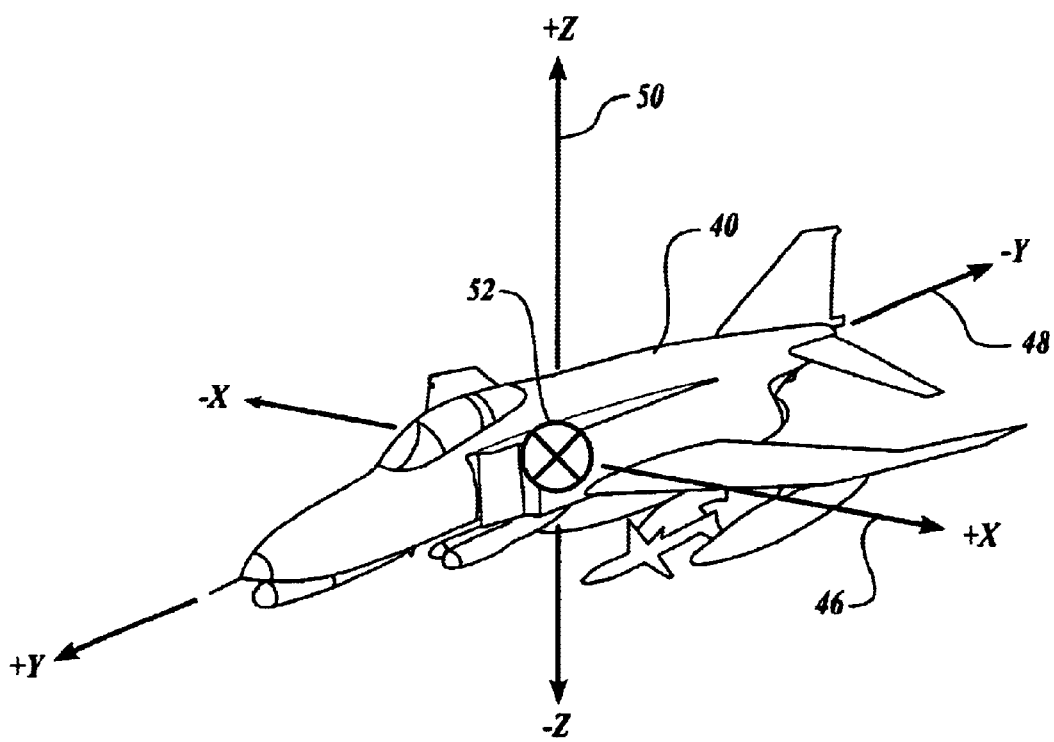
FIG. 2 is a illustrative view of axes or degrees of motion that are analyzed for a vehicle.

FIG. 2 is a perspective view of a vehicle, such as an aircraft 40. Three orthogonal axes 46, 48, 50 intersect the center of gravity (CG) 52 of the aircraft 40. The distance values are provided for each direction on each of the three axes 46, 48, 50 (or 6 degrees of freedom +x, −x, +y, −y, +z, −z). For each critical part the processor 24 computes a stress value for one or more of the 6 degrees of freedom after retrieving spring constant values for each part in the respective degree of freedom. The processor 24 computes cycles to failure for each part using retrieved associated ductility values and the associated spring constant. The computed cycles to failure for each part is recorded for later use.

Figure 3:
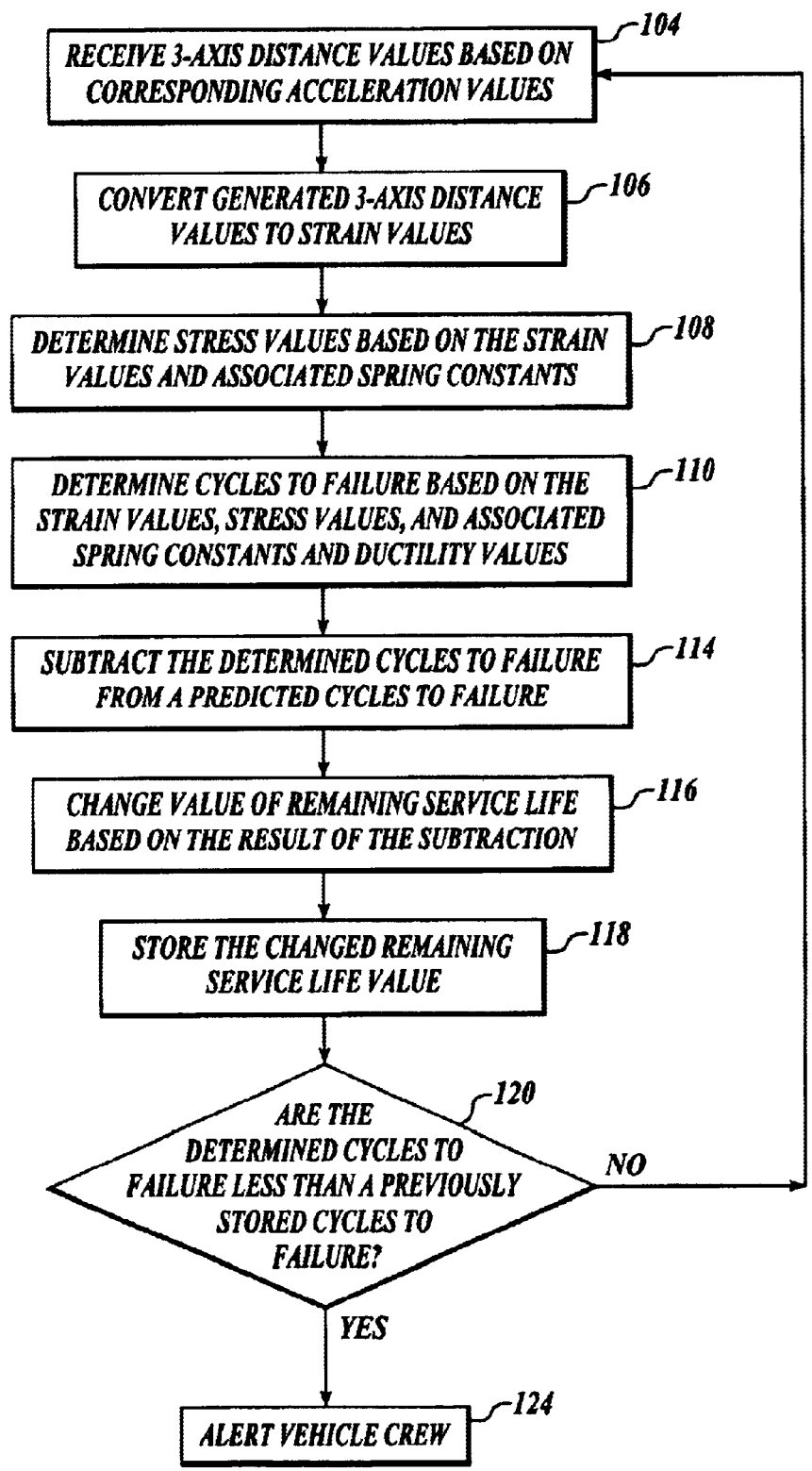
FIG. 3 is a flow diagram of a process performed by the system shown in FIG. 1.

FIG. 3 illustrates a non-limiting example of a process 100 that is performed by the system 20 shown in FIG. 1. At a block 104, the processor receives three-axis distance values (based on three-axis acceleration values) from the air data computer 26 based on information received from other aircraft system components, such as a Pitot static system, a GPS system, an Inertial Navigation System (INS), and the like. At a block 106, the processor 24 converts the generated three-axis distance values to strain amplitude according to the following equation:

$$\varepsilon = \left[\frac{l_f - l_o}{l_o}\right] \quad (1)$$

Where:
 $\varepsilon$=strain;
 $l_o$=initial length in each of the 6 degrees of motion; and
 $l_f$=final length in each of the 6 degrees of motion.
This is suitably done using Hooke's Law
 $\Delta\sigma/E=\Delta\varepsilon$
 $\Delta\varepsilon=\varepsilon_o-\varepsilon_f$
Where:
 $\sigma$=stress; and
 E=spring constant of the associated part in associated degree of motion.

At a block 110, the processor 24 determines cycles-to-failure $N_f$ for each part based on the strain amplitude $\Delta\varepsilon$. The processor 24 determines the cycles-to-failure $N_f$ by solving cycles to failure $N_f$ in the Modified Universal Slopes Equation, shown in Equation (4).

$$\Delta\varepsilon = 0.0266 D^{0.155} \left[\frac{\sigma_u}{E}\right]^{-0.53} N_f^{-0.56} + 1.17 \left[\frac{\sigma_u}{E}\right]^{0.832} N_f^{-0.09} \quad (4)$$

At a block 114, the processor 24 subtracts the determined cycles-to-failure from previously-predicted cycles-to-failure. At a block 116, a remaining service life value is changed based on the result of the subtraction. At a block 118, the changed remaining service life value is stored in the memory 30.

At a decision block 120, the processor 24 determines if the cycles to failure $N_f$ are less than previously-stored cycles-to-failure $N_f$. The previously-stored cycles-to-failure $N_f$ is suitably previously-predicted service life value as determined by previous failure testing and failure analysis of the associated part. If at the decision block 120 the determined cycles-to-failure are less than the previously-stored cycles-to-failure, then at a block 122 the vehicle's crew is alerted that the vehicle has achieved the service life limit. If at the decision block 120 the determined cycles-to-failure for all of the parts are less than previously-stored cycles-to-failure for the parts, then the process 100 returns to block 104, where the process is repeated at a predetermined frequency.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A method for determining cycles-to-failure of a vehicle, the method comprising:
 detecting acceleration in one or more of 6 degrees of freedom;
 generating distance values in at least one of 6 degrees of freedom, wherein the distance values result from the detected acceleration in the one or more of the 6 degrees of freedom;
 converting the distance values to strain values; and
 determining cycles-to-failure for one or more parts of the vehicle based on the strain values and previously-stored ductility and spring constant values for the one or more parts.

2. The method of claim 1, further comprising:
 subtracting the determined cycles-to-failure for each of the parts from a previously-predicted cycles-to-failure; and
 storing the result of the subtraction.

3. The method of claim 2, further comprising:
 alerting a crew of the vehicle if, based on the subtraction, the determined cycles-to-failure is less than the previously-predicted cycles-to-failure.

4. The method of claim 2, further comprising:
 determining service life remaining based on the result of the subtraction.

5. The method of claim 2, wherein the vehicle is an aircraft.

6. The method of claim 1, wherein determining cycles-to-failure is performed using the Modified Universal Slopes Equation.

7. A system on-board a vehicle for determining cycles-to-failure of the vehicle, the system comprising:
 a vehicle attitude reference component for generating distance values in at least one of 6 degrees of freedom, wherein the distance values are a result of detected accelerations in one or more of the 6 degrees of freedom;
 memory for storing ductility and spring constant values for at least one of the 6 degrees of freedom for one or more vehicle parts; and
 a processing component coupled to the vehicle attitude reference component and memory, the processing component including:
  a first component for converting the distance values to strain values; and
  a second component for determining cycles-to-failure for one or more of the vehicle's parts based on the strain values and associated ductility and spring constant values.

8. The system of claim 7, wherein the processing component further includes:
 a third component for subtracting the determined cycles-to-failure for each of the parts from previously-predicted cycles-to-failure; and
 a fourth component for storing the result of the subtraction in the memory.

9. The system of claim 8, further comprising:
 a vehicle crew user interface coupled to the processing component for alerting a crew of the vehicle when an alert signal is received,
 wherein the processing component further includes a fifth component for sending an alert signal to the vehicle crew user interface if the subtraction indicates the determined cycles-to-failure is less than the previously-predicted cycles-to-failure.

10. The system of claim 8, wherein the processing component further includes a fifth component for determining service life remaining based on the subtraction.

11. The system of claim 7, wherein the vehicle is an aircraft.

12. The system of claim 7, wherein the second component uses the Modified Universal Slopes Equation.

13. A vehicle comprising:
- a vehicle attitude reference component for generating distance values in at least one of 6 degrees of freedom, wherein the distance values result from detected acceleration in at least one of the 6 degrees of freedom; and
- a system for determining cycles-to-failure of the vehicle, the system including:
  - memory for storing ductility and spring constant values for at least one of the 6 degrees of freedom for one or more vehicle parts; and
  - a processing component coupled to the vehicle attitude reference component and memory, the processing component including:
    - a first component for converting the distance values to strain values; and
    - a second component for determining cycles to failure for one or more the vehicle parts based on the strain values, and associated ductility and spring constant values.

14. The vehicle of claim 13, wherein the processing component further includes:
- a third component for subtracting the determined cycles-to-failure for each of the parts from previously-predicted cycles-to-failure; and
- a fourth component for storing the result of the subtraction in the memory.

15. The vehicle of claim 14, wherein the system further includes:
- a vehicle crew user interface coupled to the processing component for alerting a crew of the vehicle when an alert signal is received,
- wherein the processing component further includes a fifth component for sending an alert signal to the vehicle crew user interface, if the subtraction indicates the determined cycles to failure is less than the previously-predicted cycles-to-failure.

16. The vehicle of claim 14, wherein the processing component further includes a fifth component for determining service life remaining based on the subtraction.

17. The vehicle of claim 13, wherein the vehicle is an aircraft.

18. The vehicle of claim 13, wherein the second component determines stress based on strain and associated spring constant values and determines cycles to failure based on the determined stress and the Modified Universal Slopes Equation.

19. The vehicle of claim 13, wherein the memory is removable from the vehicle.

20. The vehicle of claim 13, wherein the system includes a communication component for connecting to a remote processing system.

* * * * *